United States Patent
Derrick et al.

[11] Patent Number: 5,604,656
[45] Date of Patent: Feb. 18, 1997

[54] ELECTROMECHANICAL RELAYS

[75] Inventors: Ashley D. Derrick, North Humberside, England; Nicholas Hobson, Rockford, Ill.

[73] Assignee: J. H. Fenner & Co., Limited, North Humberside, England

[21] Appl. No.: 392,989

[22] PCT Filed: Jul. 4, 1994

[86] PCT No.: PCT/GB94/01438
§ 371 Date: Jun. 5, 1995
§ 102(e) Date: Jun. 5, 1995

[87] PCT Pub. No.: WO95/02254
PCT Pub. Date: Jan. 19, 1995

[30] Foreign Application Priority Data

Jul. 6, 1993 [GB] United Kingdom .................. 9313928

[51] Int. Cl.$^6$ .................................................. H01H 47/00
[52] U.S. Cl. ............................ 361/187; 361/170; 361/92; 307/102; 307/134
[58] Field of Search ........................... 324/418, 420–423; 361/27, 106, 90, 92, 73, 165, 170, 187, 190, 195; 307/134, 135, 137, 138, 117, 102, 130, 132 V; 340/644, 663

[56] References Cited

U.S. PATENT DOCUMENTS

| | | | |
|---|---|---|---|
| 1,677,157 | 7/1928 | Weaver | 324/420 |
| 3,718,839 | 2/1973 | Conti et al. | 361/92 |
| 3,886,427 | 5/1975 | Long | 320/22 |
| 4,670,812 | 6/1987 | Doerfler et al. | 361/83 |
| 4,956,637 | 9/1990 | Vogt | 340/644 |
| 4,975,800 | 12/1990 | Oshita et al. | 361/113 |
| 5,198,956 | 3/1993 | Dvorak | 361/106 |
| 5,343,351 | 8/1994 | Quantz | 361/33 |

*Primary Examiner*—Fritz Fleming
*Attorney, Agent, or Firm*—Burns, Doane, Swecker & Mathis, LLP

[57] ABSTRACT

A device for preventing welding of the switch contacts of a heavy duty electromechanical relay comprises means (15, 16 and 17) adapted in use for monitoring the voltage supply to the relay coil (2) and detecting low voltage excursions therein. A counter (14) counts the number of low voltage excursions in the voltage supply to the relay coil (2) and an electronic switch (12) disconnects the voltage supply to the relay (2) if the number of low voltage excursions counted exceeds a predetermined number.

6 Claims, 1 Drawing Sheet

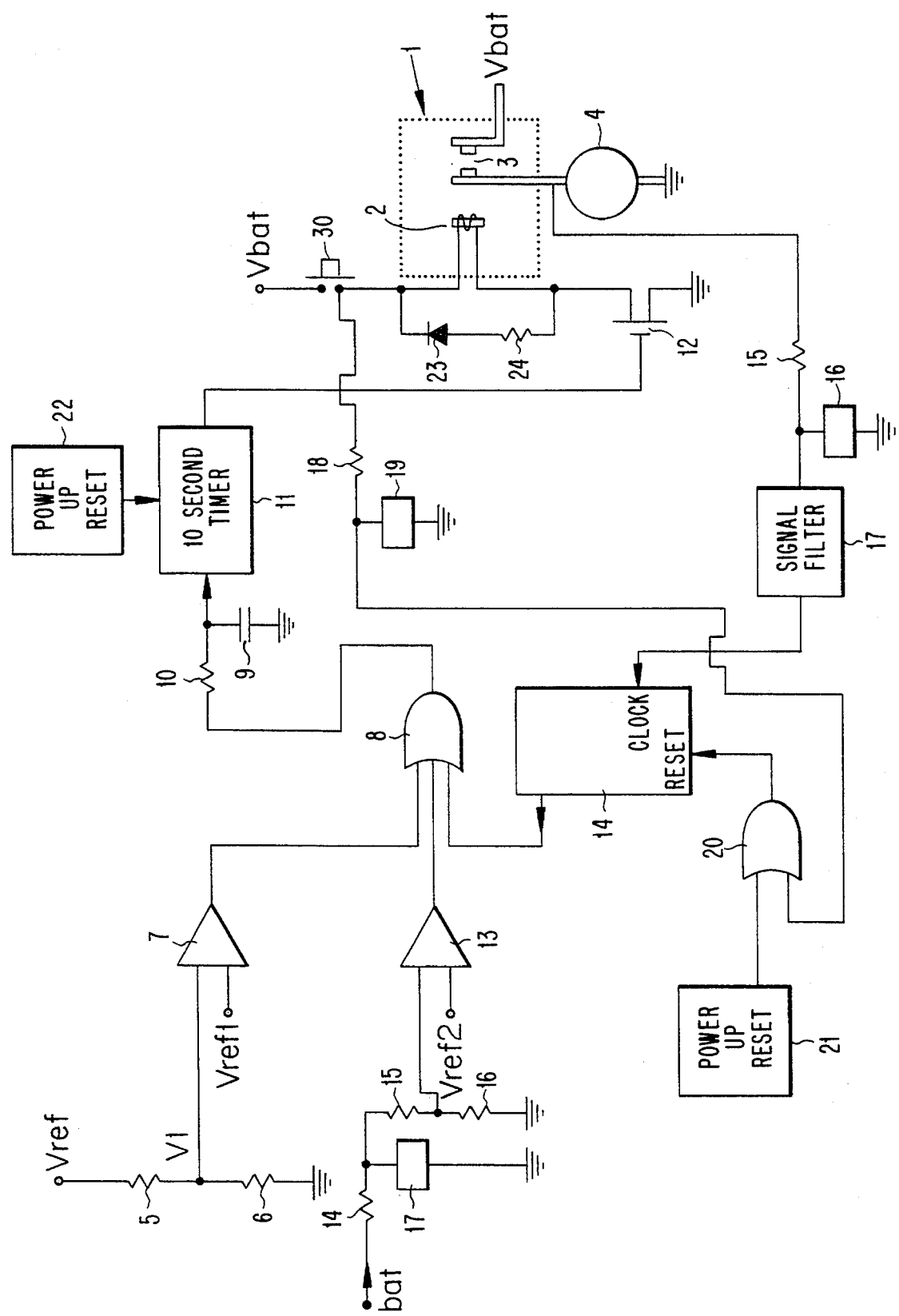

ELECTROMECHANICAL RELAYS

The present invention relates to a device for preventing the welding of the switch contacts in a heavy duty electromechanical relay. It is of particular significance to heavy duty relays used in automotive applications where cost considerations preclude the use of materials for the switch contacts which would give a better mechanical resistance to contact welding.

In many cases, heavy duty electromagnetic switches use plain copper switch contacts which have a high tendency to fuse together when breaking inductive, high current, loads. In order to prevent this from occurring, the switch contactor is frequently fitted with a return spring which has a high load versus compression factor. This spring exerts sufficient force to the moving contactor to break any contact fusing which might occur as the relay is de-energized. Provided that the relay coil is well designed and the coil voltage is close to its design parameter then the contactor usually survives its service life without catastrophic welding. However, particularly in the automotive environment, maintenance of the coil voltage at its design parameter is difficult because even under normal conditions, the high currents demanded by heavy duty motors (e.g. starter motors) and lighting circuits (e.g. the cold resistance of halogen lamps) can cause low voltage excursions to occur. In the case of an electromechanical relay controlling the supply of heavy current to a D.C. starter motor, the following situation typically occurs.

The potential difference across the vehicle battery is close to the designed coil voltage, typically 12 volts, but due to a high resistance path in the battery/motor circuit, at the instant that high current is drawn, the potential across the coil is reduced to a value which is below the drop out level of the electromagnetic switch. Consequently, the switch contacts are broken. However, at the instant the switch contacts are broken, the heavy load current is removed and the potential difference across the coil returns to a level at which the switch contacts are closed. This sequence repeats itself and an oscillatory situation therefore arises in which the switch contacts are switched in and out at a relatively high frequency. This is sometimes referred to as "doorbelling" or "fizzing". Of course, when this occurs severe arcing and plasma generation occur at the gap between the switch contacts. This rapidly increases the temperature of the switch contacts and if the condition is allowed to persist failure of the electromechanical relay can occur for any one of the following reasons:

i) switch contacts weld together ii) plastic insulators break down under the intense heat generated iii) return and switch contacts springs degrade under the intense heat generated.

The high resistance path in the battery/motor circuit which gives rise to this condition can be caused by several factors. For example, a high battery internal impedance due to undercharging, low or contaminated acid, sulphation or incorrect specification of battery. It may also be caused by poor installation of wiring, incorrect wire sizes fitted or terminal corrosion.

It is an object of the present invention to provide a device for use with a heavy duty electro-mechanical relay which obviates or at least substantially mitigates the problem of "doorbelling" or "fizzing" described hereinabove, thereby preventing welding of the switch contacts.

According to the present invention there is provided a device for preventing welding of the switch contacts of a heavy duty electromechanical relay, which device comprises means adapted in use for monitoring the voltage supply to the relay coil and detecting low voltage excursions therein, a counter for counting the number of low voltage excursions in the said voltage supply to the relay coil, and switching means for disconnecting the voltage supply to the relay if the number of low voltage excursions counted exceeds a predetermined number.

With the device of the present invention the number of times the relay switch contacts are allowed to oscillate is reduced to a very low number (the preset number set by the counter), thus "doorbelling" or "fizzing" is minimised and welding of the switch contacts is prevented.

The switching means conveniently takes the form of an electronic switch, such as a MOSFET transistor.

Preferably, the said means for monitoring and detecting low voltage excursions in the condition of the voltage supply to the relay coil is able to disregard transient low voltage excursions. Conveniently, this is achieved through the use of an RC filter network with a suitable time constant.

Advantageously, the device of the present invention further comprises a thermal sensor which is adapted in use to be mounted in the terminal housing of a relay to detect over heating thereof. This enables a high resistance fault condition at the switch contact, such as may, for example, occur if the terminals become loosened or corroded, to be detected.

Preferably, the device further comprises means for preventing operation of the relay when the battery supply is below a preset level.

The device may also comprise indicator means for indicating a fault condition.

An embodiment of the present invention will now be described, by way of example, with reference to the circuit diagram shown in the accompanying drawing.

In the circuit diagram there is shown a heavy duty electromechanical relay, generally designated by reference 1, comprising a relay coil 2 and switch contacts 3. As shown the relay 1 controls the supply of current from a battery (Vbat) to a D.C. starter motor 4.

Within the housing of the switch contacts 3 of the relay 1 is a thermal monitoring device 5, which takes the form of a thermistor, but could also be a temperature sensing semiconductor. This is used to detect the temperature of the housing as described below and remove the power to the relay coil 2 if over-heating of the switch contacts 3 occurs.

The thermistor 5 is connected at one end to a reference voltage (Vref) and at the other end to a resistor 6 which in turn is connected to ground. A potential divider is thus formed at the mid point between the thermistor 5 and the resistor 6. As the temperature of the thermistor 5 increases, its resistance decreases (negative temperature coefficient) and the voltage at the mid point (Vt) increases. This voltage is monitored by an analogue comparator 7 which compares the mid point voltage (Vt) with a reference voltage (Vref1). The value of this reference voltage (Vref1) is set such that it corresponds to the mid point voltage (Vt) produced when the thermistor temperature is at a value deemed to be the maximum allowable temperature of the contact housing. Thus when the contact housing approaches an overheated condition, the output of the comparator 7 switches state.

The output of comparator 7 is monitored by one of the three inputs of a three input "OR" gate 8 which creates a high logic-level output when the output of the comparator 7 is switched. The output of the "OR" gate 8 is fed into a low pass RC filter network consisting of a capacitor 9 and a resistor 10. This filters out any transient noise signals which may be generated by the automotive supply. Any signal which has a pulse duration which is longer than the time constant of the RC filter network then triggers a 10 second timer 11. When this timer 11 is triggered its output changes state from a high logic to a low logic level. The output of the timer 11 normally supplies a high logic level to a power MOSFET transistor 12 which is used to provide current to the relay coil 2, but removes this power when the gate voltage is removed, due to triggering of the timer 11. The timer 11 remains triggered while its trigger input is at the high logic level.

A second comparator 13 provides protection against low voltage operation of the relay call 2. This comparator 13 monitors the vehicle battery supply (Vbat) by comparing a fraction of the incoming voltage, (provided by a potential divider chain of resistors 14, 15 and 16) with a reference voltage Vref2. A transient suppressor 17 protects the input of the comparator 13 from any high voltage transients generated by the vehicle battery supply. If the battery voltage falls to a value deemed to be too low for the correct operation of the relay coil 2, then the comparator output changes from a low level to a high level state. In this situation, the output of the comparator 13 removes the power to the relay coil 2 by feeding the second input of the three input "OR" gate 8 and triggering the associated circuitry comprising the timer 11 as described hereinbefore for the high temperature cut out.

Since the relay 1 is intended for use in automotive applications, the protection circuit must ignore the inevitable, transitory, low voltage excursions produced when the D.C. starter motor 4 is first switched on. The low pass RC filter network provided by resistor 10 and capacitor 9 prevents the protection circuitry from false triggering when this situation occurs (the pulse length of a transient is shorter than the time constant of the filter components R and C).

In order to prevent extended contact oscillation which can cause severe contact erosion or welding, additional circuitry is included which detects this condition and removes the power to the relay coil 2.

A five-stage Johnson counter/divider 14 is clocked each time the switch contacts 3 are closed and then opened. This clock signal is provided by sensing the voltage on the output terminal of the switch contactor 3. The signal is conditioned by a resistor 15 and a transient suppressor 16 to remove any high voltage spikes and is further filtered by a signal filter 17 which provides a suitable clocking signal for the Johnson counter 14. The Johnson counter 14 is normally permanently reset. However, when the relay coil 2 is powered by closing switch 30, a reset signal is applied to the Johnson counter 14, from the battery (Vbat) via a resistor 18, transient suppressor 19 and a two input "OR" gate 20. Therefore, while the relay coil 2 is operated, the Johnson counter 14 is clocked by any oscillations of the switch contacts 3 which are severe enough to actually break the connection between the switch contacts. If the contacts oscillate five times, then the output of the Johnson counter 14 changes its logic state and triggers the third input of the three input "OR" gate 8 and then the input of the timer 11 via the low pass RC filter network 9, 10. Thus the power is removed from the relay coil 2 and is inhibited from further operation for ten seconds. The construction of the switch contacts 3 is such that they can safely tolerate five oscillations within a ten second periled and therefore the circuit prevents the severe damage which would occur (i.e. severe arcing or welding) if the switch contacts 3 were allowed to oscillate under load indefinitely, as is the case with standard switch contacts.

When the power to the relay coil 2 is removed, the Johnson counter 14 is reset.

Two power up reset circuits 21, 22 are used to set up the ten second timer 11 and Johnson counter 14 to their "normal" states when power is first applied to the circuit.

A diode 23 and a resistor 24 suppress the negative high-voltage spikes created across the relay coil 2 when power is removed.

What is claimed:

1. A device for preventing welding of the switch contacts of a relay caused by oscillation of the switch contacts due to low voltage excursions in the voltage across the relay coil, comprising a counter having a clock input which is clocked each time the switch contacts open and close following the connection of a voltage supply to the relay coil, and switching means for disconnecting the voltage supply to the relay when the clock count exceeds a predetermined number.

2. A device according to claim 1 wherein the switching means takes the form of an electronic switch.

3. A device according to claim 2, wherein the electronic switch comprises a MOSFET transistor.

4. A device according to claim 1, wherein the counter is reset each time power is applied to the relay coil.

5. A device according to claim 1, wherein the clock input is connected to one of the switch contacts via a signal conditioning circuit.

6. A device according to claim 1, comprising a timer device which inhibits further operation of the relay for a predetermined period following operation of the switching means to disconnect the relay coil from the voltage supply.

* * * * *